(12) United States Patent
Adachi

(10) Patent No.: US 11,852,606 B2
(45) Date of Patent: Dec. 26, 2023

(54) GAS SENSOR FOR SUPPRESSING AN INCREASE IN THE TEMPERATURE OF A GROMMET WHILE SUPPRESSING AN INCREASE IN THE SIZE COST OF GAS SENSOR PARTS

(71) Applicant: NGK Insulators, Ltd., Nagoya (JP)

(72) Inventor: Hiroki Adachi, Nagoya (JP)

(73) Assignee: NGK INSULATORS, LTD., Nagoya (JP)

( * ) Notice: Subject to any disclaimer, the term of this patent is extended or adjusted under 35 U.S.C. 154(b) by 323 days.

(21) Appl. No.: 17/213,816

(22) Filed: Mar. 26, 2021

(65) Prior Publication Data

US 2021/0302357 A1    Sep. 30, 2021

(30) Foreign Application Priority Data

Mar. 31, 2020   (JP) ................................ 2020-062603

(51) Int. Cl.
*G01N 27/407*    (2006.01)
*G01N 27/409*    (2006.01)
*G01N 27/417*    (2006.01)

(52) U.S. Cl.
CPC ....... *G01N 27/4071* (2013.01); *G01N 27/409* (2013.01); *G01N 27/417* (2013.01)

(58) Field of Classification Search
None
See application file for complete search history.

(56) References Cited

U.S. PATENT DOCUMENTS 5,874,663 A    2/1999 Fukaya et al.
2014/0290333 A1   10/2014 Hirata et al.
2014/0295715 A1   10/2014 Sakakibara et al.
2015/0276659 A1   10/2015 Sekiya et al.
2018/0284052 A1*  10/2018 Watanabe ............ G01N 27/419

FOREIGN PATENT DOCUMENTS

| JP | 09-196885 A | 7/1997 |
| JP | 2014-196917 A | 10/2014 |
| JP | 2014-209104 A | 11/2014 |
| JP | 2015-200643 A | 11/2015 |
| JP | 2019015507 A * | 1/2019 |

OTHER PUBLICATIONS

Japanese Office Action received in corresponding Japanese Application No. 2020-062603 dated Aug. 8, 2023.

* cited by examiner

*Primary Examiner* — Harshad R Patel
*Assistant Examiner* — Gedeon M Kidanu
(74) *Attorney, Agent, or Firm* — Mattingly & Malur, PC

(57) ABSTRACT

The gas sensor includes a sensor element, an element sealing member, a lead wire, a connector, an outer tube, and a grommet. The sensor element has, in the vicinity of a rear end thereof, a surface on which an electrode pad is formed. The element sealing member is configured to hold part of the sensor element. The connector is configured to hold the portion of the sensor element in which the electrode pad is formed, and to electrically connect the electrode pad and the lead wire. The outer tube is configured to be fixed to the element sealing member, and to surround the connector. The grommet is configured to be attached to a rear end of the outer tube, and to allow the lead wire to extend therethrough. A protruding portion is formed on a rear end face of the connector and is in contact with the grommet.

6 Claims, 12 Drawing Sheets

| Plate-like member | contact area (%) | Temperature of grommet (°C) | temperature reduced (°C) |
|---|---|---|---|
| Com.Ex 1 | 19.9 | 268 | 0 |
| Ex. 1 | 4.5 | 258 | -10 |
| Ex. 2 | 3.4 | 253 | -15 |

Fig.12

GAS SENSOR FOR SUPPRESSING AN INCREASE IN THE TEMPERATURE OF A GROMMET WHILE SUPPRESSING AN INCREASE IN THE SIZE COST OF GAS SENSOR PARTS

CROSS-REFERENCE TO RELATED APPLICATION

The present application claims priority from Japanese application JP2020-062603, filed on Mar. 31, 2020, the contents of which is hereby incorporated by reference into this application.

TECHNICAL FIELD

The present invention relates to a gas sensor, and particularly relates to a gas sensor configured to measure the concentration of a predetermined gas component in a measurement target gas.

BACKGROUND ART

JP 2015-200643A discloses a gas sensor. This gas sensor is configured to measure the concentration of a predetermined gas component in a measurement target gas. In the gas sensor, the rear end of the sensor element is surrounded by an outer tube. A grommet is attached to the rear end of the outer tube, and the internal portion of the outer tube is sealed. An electrode pad formed on the sensor element is electrically connected to a lead wire via a connector. The lead wire extends through the grommet to the outside of the outer tube (see JP 2015-200643A).

JP 2015-200643A is an example of related art. Also, JP H9-196885A is an example of related art.

According to the gas sensor as disclosed in JP 2015-200643A, the grommet may be pressed against the connector due to positioning of the grommet or the like during production of the gas sensor. Meanwhile, the temperature of the sensor element becomes high during use of the gas sensor, and thus the temperature of the connector holding the sensor element also becomes high. If heat is likely to be transferred from the connector to the grommet, the temperature of the grommet becomes high, and the grommet may rapidly deteriorate.

In order to solve this problem, for example, a method is conceivable in which the gas sensor is made longer, so that the distance between the heat source and the grommet increases, and the grommet is positioned away from the heat source. However, such a method is not preferable because the size of the gas sensor increases.

Furthermore, as disclosed in JP H9-196885A, for example, a method is also conceivable in which the above-described problem is solved by using a heat-resistant grommet. However, such a method is not preferable because the cost of parts increases.

The present invention was made in order to solve the above-described problems, and it is an object thereof to provide a gas sensor capable of suppressing an increase in the temperature of a grommet while suppressing an increase in the size of the gas sensor and the cost of parts.

SUMMARY OF THE INVENTION

A gas sensor according to the present invention is configured to measure the concentration of a predetermined gas component in a measurement target gas. This gas sensor includes a sensor element, an element sealing member, a lead wire, a connector, an outer tube, and a grommet. The sensor element has, in the vicinity of a rear end thereof, a surface on which an electrode pad is formed. The element sealing member is configured to hold part of the sensor element. The connector is configured to hold the portion of the sensor element in which the electrode pad is formed, and to electrically connect the electrode pad and the lead wire. The outer tube is configured to be fixed to the element sealing member, and to surround the connector. The grommet is configured to be attached to a rear end of the outer tube, and to allow the lead wire to extend therethrough. A protruding portion is formed on a rear end face of the connector. The protruding portion and the grommet are in contact with each other.

In the gas sensor, the temperature of the sensor element becomes high. Accordingly, the temperature of the connector holding the sensor element also becomes high. If the entire rear end face of the connector is in contact with the grommet, heat is likely to be transferred from the connector to the grommet. As a result, the temperature of the grommet becomes high. In the gas sensor according to the present invention, a protruding portion formed on a rear end face of the connector is in contact with the grommet, that is, it is not the case that the entire rear end face of the connector is in contact with the grommet. Thus, according to this gas sensor, the contact area between the connector and the grommet is smaller than that in the case in which the entire rear end face of the connector is in contact with the grommet, and thus it is possible to suppress heat transfer from the connector to the grommet. As a result, according to this gas sensor, deterioration of the grommet is suppressed, and thus it is possible to prolong the product life of the gas sensor.

Furthermore, it is also possible that the gas sensor further includes a protective cover configured to be fixed to the element sealing member, and to cover a front end of the sensor element, wherein the element sealing member provides sealing between spaces, the spaces being a space formed between the element sealing member and the protective cover, and a space formed between the element sealing member and the outer tube.

Furthermore, in the above-described gas sensor, it is also possible that a contact area between the protruding portion and the grommet is 5% or less of an area of a front end face of the grommet.

Furthermore, in the above-described gas sensor, it is also possible that the connector includes a plurality of plate-like members, the portion of the sensor element in which the electrode pad is formed is held between the plurality of plate-like members, and the protruding portion is formed on a rear end face of each of the plurality of plate-like members.

Furthermore, in the above-described gas sensor, it is also possible that two protruding portions are formed on the rear end face of each of the plurality of plate-like members, one of the two protruding portions is formed at one end in a longitudinal direction of the rear end face, and another of the two protruding portions is formed at another end in the longitudinal direction of the rear end face.

The inventor(s) of the present invention found that the temperature of the grommet becomes comparatively high at a region thereof facing a sensor element, due to the influence of radiant heat from the sensor element. In this gas sensor, the protruding portions are formed at ends in the longitudinal direction of the rear end face of each plate-like member. Accordingly, the protruding portions are in contact with the grommet at positions that are comparatively distant from the high temperature region (the region facing the sensor element) of the grommet. As a result, according to this gas sensor, heat is transferred from the plate-like members to the grommet mainly via comparatively low temperature regions in the grommet, and thus it is possible to suppress non-uniformity in the temperature in the grommet. As a result, according to this gas sensor, deterioration of the grommet is suppressed, and thus it is possible to prolong the product life of the gas sensor.

Furthermore, in the above-described gas sensor, it is also possible that, in both of a plan view of the plate-like members and a side view of the plate-like members, the protruding portions are respectively provided with tapers in which the protruding portions are thinner toward the rear ends.

According to this gas sensor, the tip portions of the protruding portions are thinner than the base portions of the protruding portions, and thus the contact area between the protruding portions and the grommet can be made smaller. Furthermore, according to this gas sensor, the base portions of the protruding portions are thicker than the tip portions of the protruding portions, and thus the strength of the protruding portions can be ensured to some extent. That is to say, according to this gas sensor, it is possible to reduce the contact area between the protruding portions and the grommet, and, at the same time, to ensure the strength of the protruding portions.

According to the present invention, it is possible to provide a gas sensor capable of suppressing an increase in the temperature of a grommet while suppressing an increase in the size of the gas sensor and the cost of parts.

BRIEF DESCRIPTION OF THE DRAWINGS

FIG. 12 is a table showing the result of an evaluation test.

EMBODIMENTS OF THE INVENTION

Figure 1:
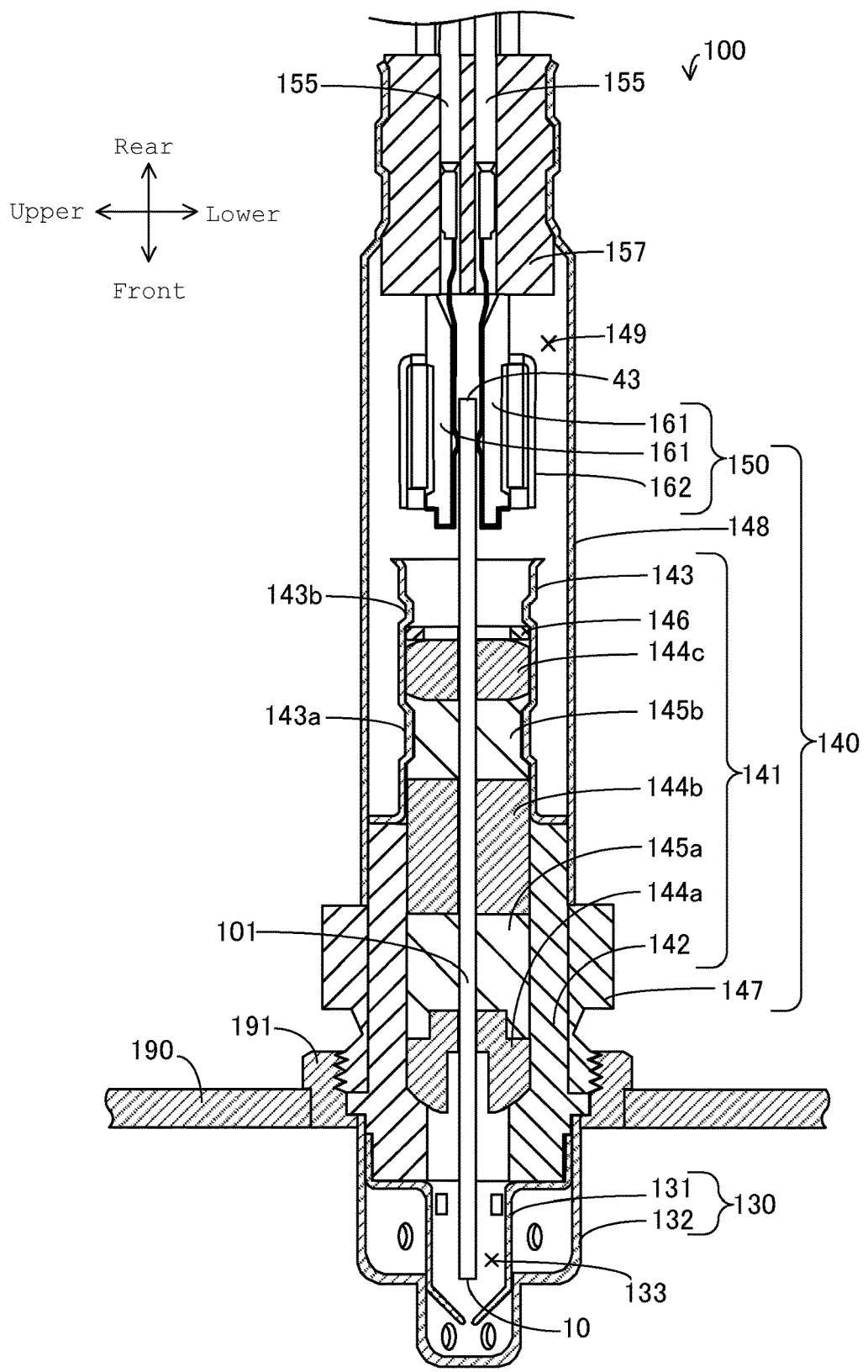
FIG. 1 is a view schematically showing a vertical cross-section of a gas sensor.

Hereinafter, an embodiment of the present invention will be described in detail with reference to the drawings. Note that the same or corresponding constituent elements in the drawings are denoted by the same reference numerals and a description thereof will not be repeated.

1. OVERALL CONFIGURATION OF GAS SENSOR

FIG. 1 is a view schematically showing a vertical cross-section of a gas sensor 100 according to this embodiment. In the drawings, the longitudinal direction of a later-described sensor element 101 corresponds to the front-rear direction, and the thickness direction of the sensor element 101 corresponds to the upper-lower direction. Furthermore, the width direction of the sensor element 101 corresponds to the left-right direction.

As shown in FIG. 1, for example, the gas sensor 100 is attached to a pipe 190 such as an exhaust gas pipe of a vehicle. The gas sensor 100 is configured to measure the concentration of a predetermined gas component in a measurement target gas such as exhaust gas. Examples of the predetermined gas component include NOx and $O_2$. Note that the gas sensor 100 according to this embodiment is configured to measure the NOx concentration in the measurement target gas.

The gas sensor 100 includes a sensor element 101, a protective cover 130, a sensor assembly 140, lead wires 155, and a grommet 157. The sensor element 101 is in the shape of an elongated cuboid shape, and is used to detect a predetermined gas component in a measurement target gas.

Figure 2:
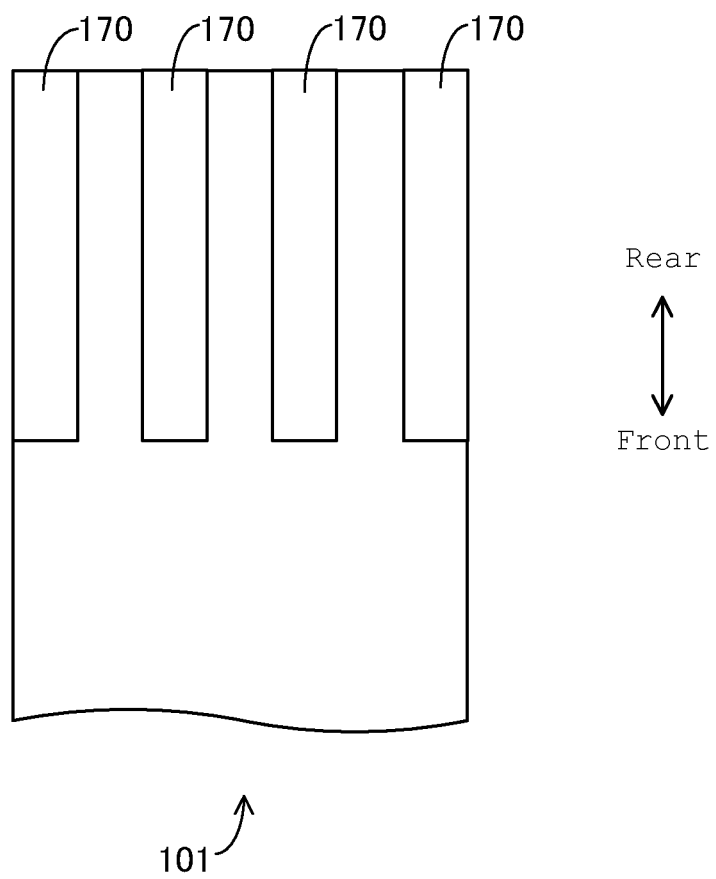
FIG. 2 is a view schematically showing part of the vicinity of the rear end of the upper face of a sensor element.

FIG. 2 is a view schematically showing part of the vicinity of the rear end of the upper face of the sensor element 101. As shown in FIG. 2, a plurality of (four) electrode pads 170 are formed in the vicinity of the rear end of the upper face of the sensor element 101. Furthermore, a plurality of (four) electrode pads 170 are formed also in the vicinity of the rear end of the lower face of the sensor element 101. The electrode pads 170 are used to transfer various signals. The sensor element 101 will be described later in detail. Note that "vicinity of the rear end" does not absolutely have to include the rear end, and means that it is a position that is closer to the rear end than the front end.

Again referring to FIG. 1, the protective cover 130 includes an inner protective cover 131 and an outer protective cover 132. The inner protective cover 131 is in the shape of a bottomed tube, and covers the front end of the sensor element 101. The outer protective cover 132 is in the shape of a bottomed tube, and covers the inner protective cover 131. A plurality of holes for introducing the measurement target gas into the protective cover 130 are formed through each of the inner protective cover 131 and the outer protective cover 132. A sensor element chamber 133 is formed as a space defined by the inner protective cover 131, and the front end of the sensor element 101 is arranged inside the sensor element chamber 133.

The sensor assembly 140 includes an element sealing member 141, a nut 147, a connector 150, and an outer tube 148.

The element sealing member 141 seals and fixes the sensor element 101. The element sealing member 141 includes a tubular main fitting 142, a tubular inner tube 143, ceramic supporters 144a to 144c, green compacts 145a and 145b, and a metal ring 146. The inner tube 143 is fixed through welding to the main fitting 142 such that the position of the central axis of the inner tube 143 matches the position of the central axis of the main fitting 142. The ceramic supporters 144a to 144c, the green compacts 145a and 145b, and the metal ring 146 are sealed inside a through-hole in the main fitting 142 and the inner tube 143. The sensor element 101 is positioned along the central axis of the element sealing member 141, and extends through the element sealing member 141 in the front-rear direction.

Reduced diameter portions 143a and 143b are formed on the inner tube 143. The reduced diameter portion 143a presses the green compact 145b toward the central axis of the inner tube 143. The reduced diameter portion 143b presses the ceramic supporters 144a to 144c and the green compacts 145a and 145b to the front side via the metal ring 146. The green compacts 145a and 145b are compressed between the main fitting 142 and the inner tube 143, and the sensor element 101 due to the pressure from the reduced diameter portions 143a and 143b. Accordingly, the green compacts 145a and 145b provide sealing between spaces, the spaces being a space 149 inside the outer tube 148 and the space inside the sensor element chamber 133, and immobilize the sensor element 101.

The nut 147 is a so-called screw nut, and is attached to the element sealing member 141. The position of the central axis of the nut 147 matches the position of the central axis of the main fitting 142. A male thread portion is formed on the outer circumferential face of the nut 147. The male thread portion of the nut 147 is inserted into a fixing member 191 welded to the pipe 190. A female thread portion is formed on the inner circumferential face of the fixing member 191. When the male thread portion of the nut 147 and the female thread portion of the fixing member 191 are screwed into each other, the gas sensor 100 is fixed to the pipe 190 in a state in which the front end of the sensor element 101 and the protective cover 130 project into the pipe 190.

The connector 150 holds the portion of the sensor element 101 in which the electrode pads 170 are formed, and electrically connects the electrode pads 170 and the lead wires 155. The connector 150 includes a plurality of (two) ceramic plate-like members 161 and a fixing member 162. The portion of the sensor element 101 in which the electrode pads 170 are formed is held between the plurality of plate-like members 161. A plurality of (four) metal terminals are arranged on each of the plate-like members 161, and the metal terminals and the electrode pads 170 are in contact with each other. The lead wires 155 are respectively welded to the metal terminals. That is to say, the electrode pads 170 and the lead wires 155 are electrically connected to each other via the metal terminals. The fixing member 162 fixes the plurality of plate-like members 161, the sensor element 101, and the like so as to maintain a state in which the metal terminals arranged on the plate-like members 161 and the electrode pads 170 are in contact with each other. The plate-like members 161 will be described later in detail.

The outer tube 148 is fixed to the main fitting 142, and surrounds the inner tube 143, the sensor element 101, and the connector 150. The grommet 157 is attached to the rear end of the outer tube 148. The grommet 157 is constituted by, for example, a rubber plug. The front end of the grommet 157 is pressed against the rear ends of the plate-like members 161. That is to say, the front end of the grommet 157 is in contact with the rear ends of the plate-like members 161. The lead wires 155 extend through the grommet 157. That is to say, the gap between the outer tube 148 and the lead wires 155 is sealed by the grommet 157. The space 149 inside the outer tube 148 is filled with reference gas (air in this embodiment). The rear end of the sensor element 101 is arranged inside the space 149.

2. CONFIGURATION OF SENSOR ELEMENT

Figure 3:
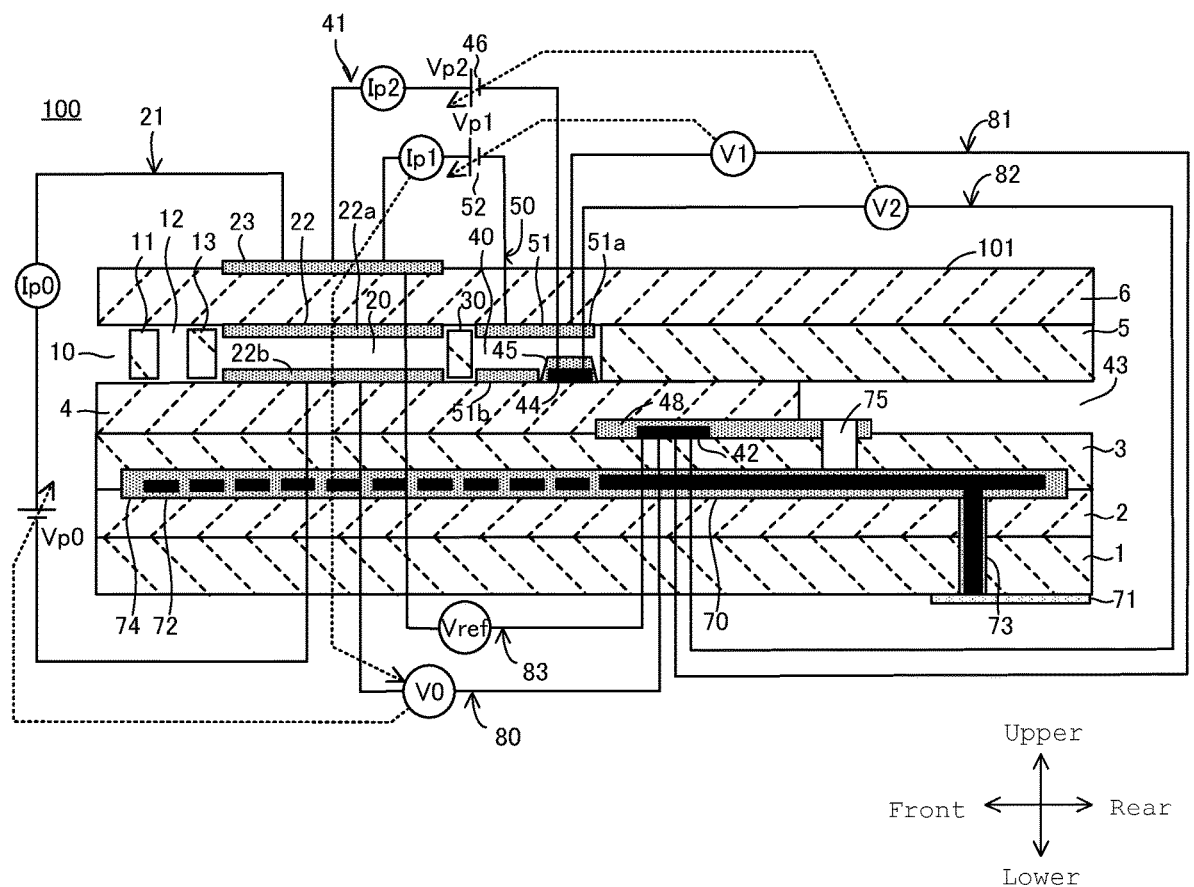
FIG. 3 is a cross-sectional schematic view schematically showing an example of the configuration of the sensor element.

FIG. 3 is a cross-sectional schematic view schematically showing an example of the configuration of the sensor element 101 included in the gas sensor 100. The sensor element 101 is an element having a structure in which six layers consisting of a first substrate layer 1, a second substrate layer 2, a third substrate layer 3, a first solid electrolyte layer 4, a spacer layer 5, and a second solid electrolyte layer 6 are stacked in this order from the lower side in the drawing, the layers being each constituted by an oxygen ion-conductive solid electrolyte layer made of zirconia ($ZrO_2$) or the like. Furthermore, the solid electrolyte forming these six layers is a dense and airtight material. The sensor element 101 with this configuration is produced, for example, by performing predetermined processing and printing of circuit patterns on ceramic green sheets corresponding to the respective layers, stacking the resultant layers, and integrating them through firing.

In the front end portion of the sensor element 101, a gas introduction opening 10, a first diffusion control unit 11, a buffer space 12, a second diffusion control unit 13, a first internal cavity 20, a third diffusion control unit 30, and a second internal cavity 40 are arranged in this order adjacent to each other in a connected manner between the lower face of the second solid electrolyte layer 6 and the upper face of the first solid electrolyte layer 4.

The gas introduction opening 10, the buffer space 12, the first internal cavity 20, and the second internal cavity 40 are spaces inside the sensor element 101, the spaces being each formed by cutting out the spacer layer 5, and each having an upper portion defined by the lower face of the second solid electrolyte layer 6, a lower portion defined by the upper face of the first solid electrolyte layer 4, and side portions defined by the side faces of the spacer layer 5.

Each of the first diffusion control unit 11, the second diffusion control unit 13, and the third diffusion control unit 30 is provided as two laterally long slits (whose openings have the longitudinal direction that is along the direction perpendicular to the section of the diagram). Note that the region from the gas introduction opening 10 to the second internal cavity 40 is also referred to as a gas flow passage.

Furthermore, a reference gas introduction space 43 having side portions defined by the side faces of the first solid electrolyte layer 4 is provided between the upper face of the third substrate layer 3 and the lower face of the spacer layer 5, at a position that is farther from the front side than the gas flow passage is. For example, air is introduced into the reference gas introduction space 43, as reference gas for use in measurement of an NOx concentration.

An air introduction layer 48 is a layer made of porous alumina, and reference gas is introduced into the air introduction layer 48 via the reference gas introduction space 43. Furthermore, the air introduction layer 48 is formed so as to cover a reference electrode 42.

The reference electrode 42 is an electrode formed so as to be held between the upper face of the third substrate layer 3 and the first solid electrolyte layer 4, and, as described above, is covered by the air introduction layer 48 that is continuous with the reference gas introduction space 43. Furthermore, as will be described later, it is possible to measure the oxygen concentration (oxygen partial pressure) in the first internal cavity 20 or the second internal cavity 40, using the reference electrode 42.

In the gas flow passage, the gas introduction opening 10 is a region that is open to the external space, and measurement target gas is introduced from the external space via the gas introduction opening 10 into the sensor element 101.

The first diffusion control unit 11 is a region that applies a predetermined diffusion resistance to the measurement target gas introduced from the gas introduction opening 10.

The buffer space 12 is a space that is provided in order to guide the measurement target gas introduced from the first diffusion control unit 11 to the second diffusion control unit 13.

The second diffusion control unit 13 is a region that applies a predetermined diffusion resistance to the measurement target gas introduced from the buffer space 12 into the first internal cavity 20.

When the measurement target gas is introduced from the outside of the sensor element 101 into the first internal cavity 20, the measurement target gas abruptly introduced from the gas introduction opening 10 into the sensor element 101 due to a change in the pressure of the measurement target gas in the external space (a pulsation of the exhaust pressure in the case in which the measurement target gas is exhaust gas of an automobile) is not directly introduced into the first internal cavity 20, but is introduced into the first internal cavity 20 after passing through the first diffusion control unit 11, the buffer space 12, and the second diffusion control unit 13 where a change in the concentration of the measurement target gas is canceled. Accordingly, a change in the concentration of the measurement target gas introduced into the first internal cavity is reduced to be almost negligible.

The first internal cavity 20 is provided as a space for adjusting the oxygen partial pressure in the measurement target gas introduced via the second diffusion control unit 13. The oxygen partial pressure is adjusted through an operation of a main pump cell 21.

The main pump cell 21 is an electro-chemical pump cell constituted by an internal pump electrode 22 having a ceiling electrode portion 22a provided over substantially the entire lower face of the second solid electrolyte layer 6 that faces the first internal cavity 20, an external pump electrode 23 provided so as to be exposed to the external space in the region corresponding to the ceiling electrode portion 22a on the upper face of the second solid electrolyte layer 6, and the second solid electrolyte layer 6 held between these electrodes.

The internal pump electrode 22 is formed across upper and lower solid electrolyte layers (the second solid electrolyte layer 6 and the first solid electrolyte layer 4) that define the first internal cavity 20, and the spacer layer 5 that forms side walls. Specifically, the ceiling electrode portion 22a is formed on the lower face of the second solid electrolyte layer 6 that forms the ceiling face of the first internal cavity 20, a bottom electrode portion 22b is formed on the upper face of the first solid electrolyte layer 4 that forms the bottom face, and side electrode portions (not shown) that connect the ceiling electrode portion 22a and the bottom electrode portion 22b are formed on side wall faces (inner faces) of the spacer layer 5 that form two side wall portions of the first internal cavity 20, so that the entire structure is arranged in the form of a tunnel at the region in which the side electrode portions are arranged.

The internal pump electrode 22 and the external pump electrode 23 are formed as porous cermet electrodes (e.g., cermet electrodes of Pt and $ZrO_2$ containing 1% of Au). Note that the internal pump electrode 22 with which the measurement target gas is brought into contact is made of a material that has a lowered capability of reducing an NOx component in the measurement target gas.

The main pump cell 21 can apply a desired pump voltage Vp0 to a point between the internal pump electrode 22 and the external pump electrode 23, thereby causing a pump current Ip0 to flow in the positive direction or the negative direction between the internal pump electrode 22 and the external pump electrode 23, so that oxygen in the first internal cavity 20 is pumped out to the external space or oxygen in the external space is pumped into the first internal cavity 20.

Furthermore, in order to detect the oxygen concentration (oxygen partial pressure) in the atmosphere in the first internal cavity 20, the internal pump electrode 22, the second solid electrolyte layer 6, the spacer layer 5, the first solid electrolyte layer 4, the third substrate layer 3, and the reference electrode 42 constitute an electro-chemical sensor cell, that is, a main pump-controlling oxygen partial pressure detection sensor cell 80.

It is possible to see the oxygen concentration (oxygen partial pressure) in the first internal cavity 20 by measuring an electromotive force V0 in the main pump-controlling oxygen partial pressure detection sensor cell 80. Furthermore, the pump current Ip0 is controlled by performing feedback control on Vp0 such that the electromotive force V0 is kept constant. Accordingly, the oxygen concentration in the first internal cavity 20 can be kept at a predetermined constant value.

The third diffusion control unit 30 is a region that applies a predetermined diffusion resistance to the measurement target gas whose oxygen concentration (oxygen partial pressure) has been controlled through an operation of the main pump cell 21 in the first internal cavity 20, thereby guiding the measurement target gas to the second internal cavity 40.

The second internal cavity 40 is provided as a space for performing processing regarding measurement of the concentration of nitrogen oxide (NOx) in the measurement target gas introduced via the third diffusion control unit 30. The NOx concentration is measured mainly in the second internal cavity 40 whose oxygen concentration has been adjusted by an auxiliary pump cell 50, through an operation of a measurement pump cell 41.

In the second internal cavity 40, the measurement target gas subjected to adjustment of the oxygen concentration (oxygen partial pressure) in advance in the first internal cavity 20 and then introduced via the third diffusion control unit is further subjected to adjustment of the oxygen partial pressure by the auxiliary pump cell 50. Accordingly, the oxygen concentration in the second internal cavity 40 can be precisely kept at a constant value, and thus the gas sensor 100 can measure the NOx concentration with a high level of precision.

The auxiliary pump cell 50 is an auxiliary electro-chemical pump cell constituted by an auxiliary pump electrode 51 having a ceiling electrode portion 51a provided on substantially the entire lower face of the second solid electrolyte layer 6 that faces the second internal cavity 40, the external pump electrode 23 (which is not limited to the external pump electrode 23, and may be any appropriate electrode outside the sensor element 101), and the second solid electrolyte layer 6.

The auxiliary pump electrode 51 with this configuration is arranged inside the second internal cavity 40 in the form of a tunnel as with the above-described internal pump electrode 22 arranged inside the first internal cavity 20. That is to say, the ceiling electrode portion 51a is formed on the second solid electrolyte layer 6 that forms the ceiling face of the second internal cavity 40, a bottom electrode portion 51b is formed on the first solid electrolyte layer 4 that forms the bottom face of the second internal cavity 40, and side electrode portions (not shown) that connect the ceiling electrode portion 51a and the bottom electrode portion 51b are formed on two wall faces of the spacer layer 5 that form side walls of the second internal cavity 40, so that the entire structure is arranged in the form of a tunnel.

Note that the auxiliary pump electrode 51 is also made of a material that has a lowered capability of reducing an NOx component in the measurement target gas, as with the internal pump electrode 22.

The auxiliary pump cell 50 can apply a desired voltage Vp1 to a point between the auxiliary pump electrode 51 and the external pump electrode 23, so that oxygen in the atmosphere in the second internal cavity 40 is pumped out to the external space or oxygen in the external space is pumped into the second internal cavity 40.

Furthermore, in order to control the oxygen partial pressure in the atmosphere in the second internal cavity 40, the auxiliary pump electrode 51, the reference electrode 42, the second solid electrolyte layer 6, the spacer layer 5, the first solid electrolyte layer 4, and the third substrate layer 3 constitute an electro-chemical sensor cell, that is, an auxiliary pump-controlling oxygen partial pressure detection sensor cell 81.

Note that the auxiliary pump cell 50 performs pumping using a variable power source 52 whose voltage is controlled based on an electromotive force V1 detected by the auxiliary pump-controlling oxygen partial pressure detection sensor cell 81. Accordingly, the oxygen partial pressure in the atmosphere in the second internal cavity 40 is controlled to be a partial pressure that is low enough to not substantially affect the NOx measurement.

Furthermore, a pump current Ip1 is used to control the electromotive force of the main pump-controlling oxygen partial pressure detection sensor cell 80. Specifically, the pump current Ip1 is input as a control signal to the main pump-controlling oxygen partial pressure detection sensor cell 80, and the electromotive force V0 is controlled such that a gradient of the oxygen partial pressure in the measurement target gas that is introduced from the third diffusion control unit 30 into the second internal cavity 40 is always kept constant. When the sensor is used as an NOx sensor, the oxygen concentration in the second internal cavity 40 is kept at a constant value that is about 0.001 ppm through an operation of the main pump cell 21 and the auxiliary pump cell 50.

The measurement pump cell 41 measures the NOx concentration in the measurement target gas, in the second internal cavity 40. The measurement pump cell 41 is an electro-chemical pump cell constituted by a measurement electrode 44 spaced away from the third diffusion control unit 30, on the upper face of the first solid electrolyte layer 4 that faces the second internal cavity 40, the external pump electrode 23, the second solid electrolyte layer 6, the spacer layer 5, and the first solid electrolyte layer 4.

The measurement electrode 44 is a porous cermet electrode. The measurement electrode 44 functions also as an NOx reduction catalyst for reducing NOx that is present in the atmosphere in the second internal cavity 40. Furthermore, the measurement electrode 44 is covered by a fourth diffusion control unit 45.

The fourth diffusion control unit 45 is a membrane constituted by a porous member mainly made of alumina ($Al_2O_3$). The fourth diffusion control unit 45 serves to limit the amount of NOx flowing into the measurement electrode 44, and also functions as a protective membrane of the measurement electrode 44.

The measurement pump cell 41 can pump out oxygen generated through degradation of nitrogen oxide in the atmosphere around the measurement electrode 44, and detect the generated amount as a pump current Ip2.

Furthermore, in order to detect the oxygen partial pressure around the measurement electrode 44, the second solid electrolyte layer 6, the spacer layer 5, the first solid electrolyte layer 4, the third substrate layer 3, the measurement electrode 44, and the reference electrode 42 constitute an electro-chemical sensor cell, that is, a measurement pump-controlling oxygen partial pressure detection sensor cell 82. A variable power source 46 is controlled based on an electromotive force V2 detected by the measurement pump-controlling oxygen partial pressure detection sensor cell 82.

The measurement target gas guided into the second internal cavity 40 passes through the fourth diffusion control unit 45 and reaches the measurement electrode 44 in a state in which the oxygen partial pressure is controlled. Nitrogen oxide in the measurement target gas around the measurement electrode 44 is reduced to generate oxygen ($2NO \rightarrow N_2 + O_2$). The generated oxygen is pumped by the measurement pump cell 41, and, at that time, a voltage Vp2 of the variable power source is controlled such that a control voltage V2 detected by the measurement pump-controlling oxygen partial pressure detection sensor cell 82 is kept constant. The amount of oxygen generated around the measurement electrode 44 is proportional to the concentration of nitrogen oxide in the measurement target gas, and thus it is possible to calculate the concentration of nitrogen oxide in the measurement target gas, using the pump current Ip2 in the measurement pump cell 41.

Furthermore, if the measurement electrode 44, the first solid electrolyte layer 4, the third substrate layer 3, and the reference electrode 42 are combined to constitute an oxygen partial pressure detection means as an electro-chemical sensor cell, it is possible to detect an electromotive force that corresponds to a difference between the amount of oxygen generated through reduction of an NOx component in the atmosphere around the measurement electrode 44 and the amount of oxygen contained in reference air can be detected, and thus it is also possible to obtain the concentration of the NOx component in the measurement target gas.

Furthermore, the second solid electrolyte layer 6, the spacer layer 5, the first solid electrolyte layer 4, the third substrate layer 3, the external pump electrode 23, and the reference electrode 42 constitute an electro-chemical sensor cell 83, and it is possible to detect the oxygen partial pressure in the measurement target gas outside the sensor, based on an electromotive force Vref obtained by the sensor cell 83.

In the gas sensor 100 with this configuration, when the main pump cell 21 and the auxiliary pump cell 50 operate, the measurement target gas whose oxygen partial pressure is always kept at a constant low value (a value that does not substantially affect the NOx measurement) is supplied to the measurement pump cell 41. Accordingly, it is possible to see the NOx concentration in the measurement target gas, based on the pump current Ip2 that flows when oxygen generated through reduction of NOx is pumped out by the measurement pump cell 41, substantially in proportion to the concentration of NOx in the measurement target gas.

Furthermore, in order to improve the oxygen ion conductivity of the solid electrolyte, the sensor element 101 includes a heater unit 70 that serves to adjust the temperature of the sensor element 101 through heating and heat retention. The heater unit 70 includes a heater electrode 71, a heater 72, a through-hole 73, a heater insulating layer 74, and a pressure dispersing hole 75.

The heater electrode 71 is an electrode formed so as to be in contact with the lower face of the first substrate layer 1. When the heater electrode 71 is connected to an external power source, electricity can be supplied from the outside to the heater unit 70.

The heater 72 is an electrical resistor formed so as to be held between the second substrate layer 2 and the third substrate layer 3 from above and below. The heater 72 is connected via the through-hole 73 to the heater electrode 71, and, when electricity is supplied from the outside via the heater electrode 71, the heater 72 generates heat, thereby heating and keeping the temperature of a solid electrolyte constituting the sensor element 101.

Furthermore, the heater 72 is embedded over the entire region from the first internal cavity 20 to the second internal cavity 40, and thus the entire sensor element 101 can be adjusted to a temperature at which the above-described solid electrolyte is activated.

The heater insulating layer 74 is an insulating layer constituted by an insulating member made of alumina or the like on the upper and lower faces of the heater 72. The heater insulating layer 74 is formed in order to realize the electrical insulation between the second substrate layer 2 and the heater 72 and the electrical insulation between the third substrate layer 3 and the heater 72.

The pressure dispersing hole 75 is a hole that extends through the third substrate layer 3 and is connected to the reference gas introduction space 43, and is formed in order to alleviate an increase in the internal pressure in accordance with an increase in the temperature in the heater insulating layer 74.

3. CONFIGURATION OF PLATE-LIKE MEMBERS CONTAINED IN CONNECTOR

Figure 4:
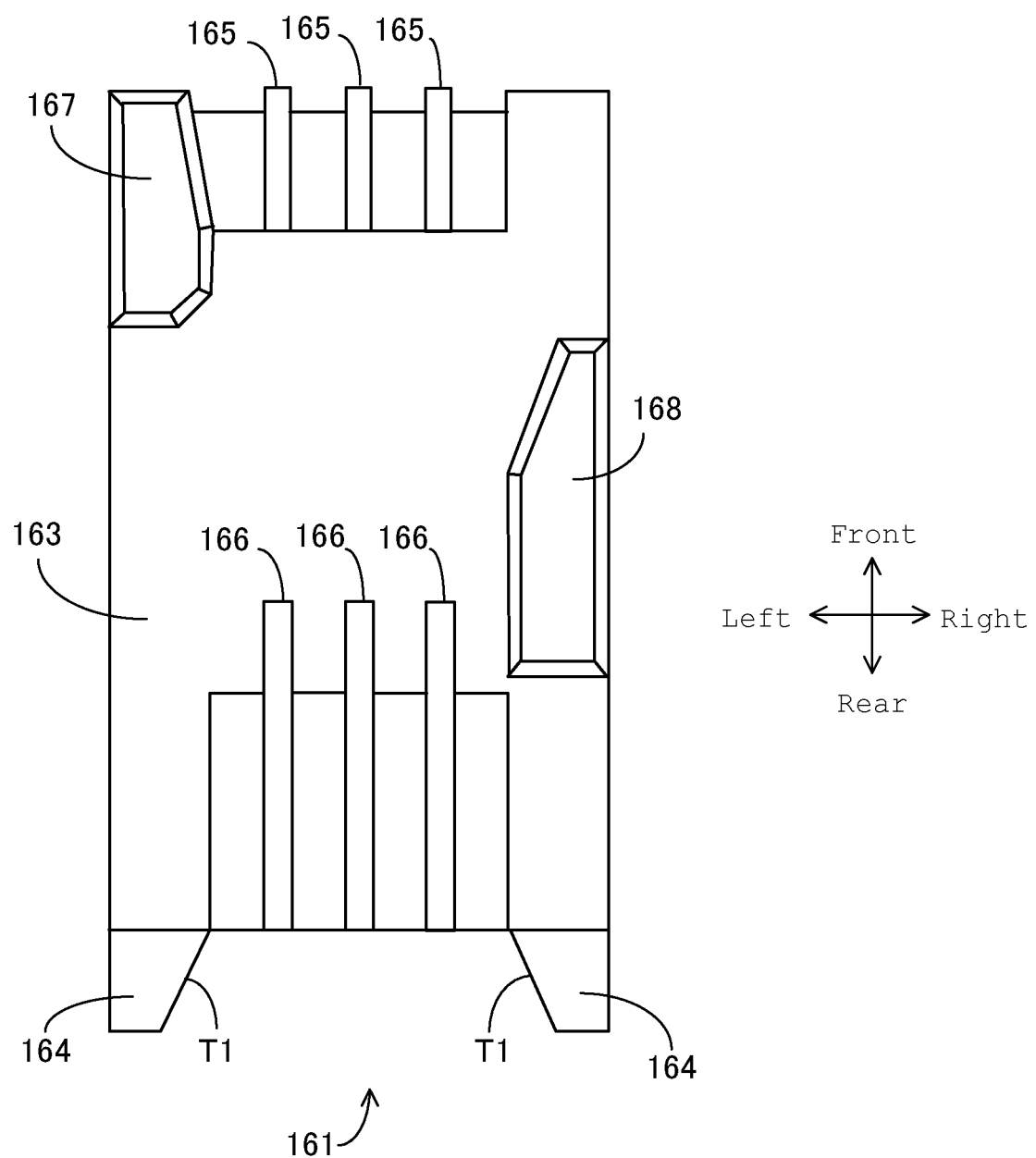
FIG. 4 is a schematic view showing a plate-like member from one side in the upper-lower direction.
Figure 5:
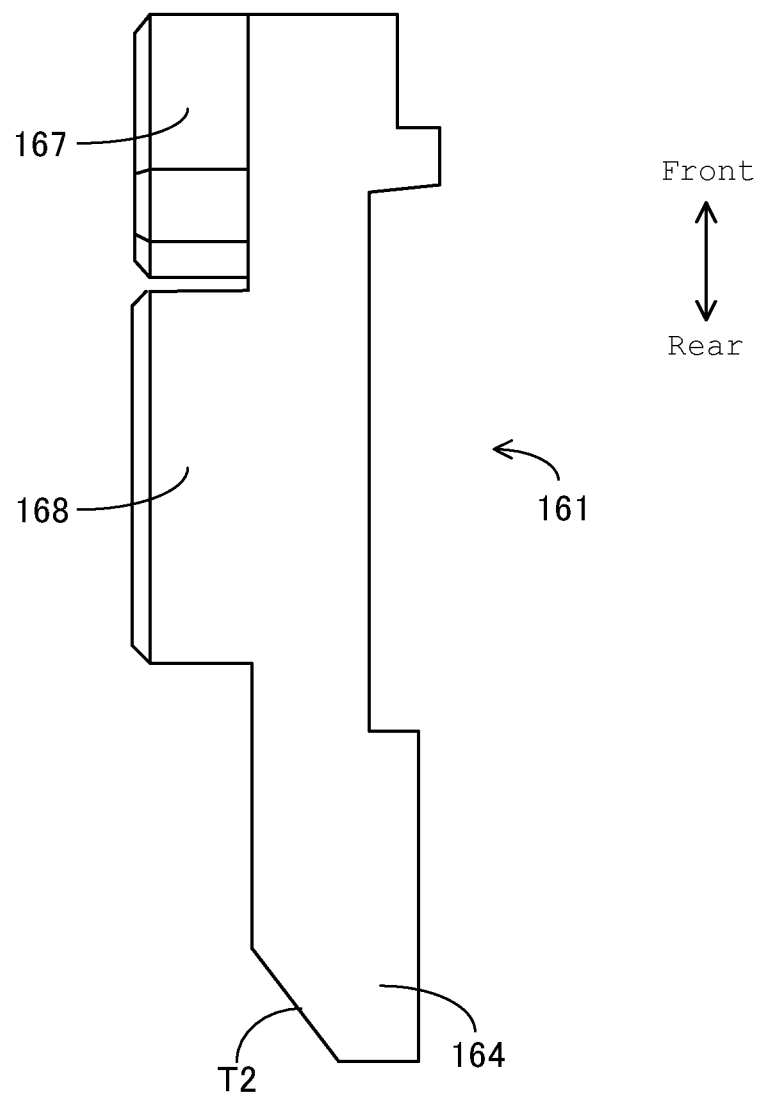
FIG. 5 is a schematic view showing the plate-like member from one side in the left-right direction.
Figure 6:
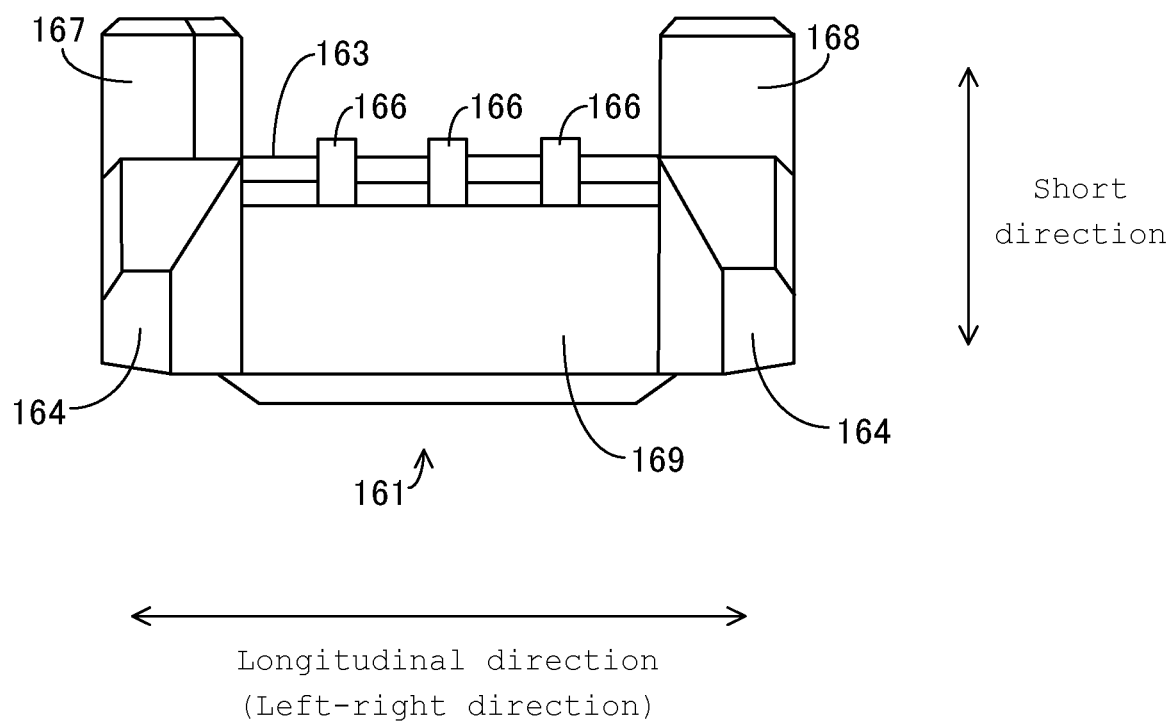
FIG. 6 is a schematic view showing the plate-like member from the rear.

FIG. 4 is a schematic view showing a plate-like member 161 from one side in the upper-lower direction. FIG. 5 is a schematic view showing the plate-like member 161 from one side in the left-right direction. FIG. 6 is a schematic view showing the plate-like member 161 from the rear.

As shown in FIGS. 4, 5, and 6, the plate-like member 161 is a member substantially in the shape of a rectangular plate in a plan view. The width in the left-right direction of the plate-like member 161 is longer than the width of the sensor element 101. The plate-like member 161 includes a plate-like member body portion 163 substantially in the shape of a flat plate, a plurality of (three) partitioning wall portions 165, a plurality of (three) partitioning wall portions 166, abutting portions 167 and 168, and a plurality of (two) protruding portions 164.

The partitioning wall portions 165 and 166 are each in the shape of a rectangle that extends in the front-rear direction in a plan view, and project from the plate-like member body portion 163, for example, toward the forward direction of FIG. 4. The partitioning wall portions 165 and 166 are positioned between the above-mentioned plurality of metal terminals that are arranged on the plate-like member body portion 163. Accordingly, the plurality of metal terminals do not come into contact with each other.

The abutting portions 167 and 168 project from the plate-like member body portion 163, for example, toward the forward direction of FIG. 4. As described above, the portion of the sensor element 101 in which the electrode pads 170 are formed is held between the two plate-like members 161. The abutting portions 167 and 168 abut against the plate-like member body portion 163 of the opposing plate-like member 161 in a state in which the sensor element 101 is held between the two plate-like members 161.

The plurality of protruding portions 164 extend toward the rear from a rear end face 169 of the plate-like member 161 (FIG. 6). One of the protruding portions 164 is formed at one end in the longitudinal direction (left-right direction) of the face 169, and the other of the protruding portions 164 is formed at the other end in the longitudinal direction of the face 169. In a plan view of the plate-like member 161 (see FIG. 4), the protruding portions 164 are respectively provided with tapers T1 in which the protruding portions 164 are thinner toward the rear ends. Furthermore, in a side view of the plate-like member 161 (see FIG. 5), the protruding portions 164 are respectively provided with tapers T2 in which the protruding portions 164 are thinner toward the rear ends.

4. SUPPRESSING DETERIORATION OF GROMMET

As described above, in the gas sensor 100, the front end of the grommet 157 is pressed against the rear ends of the plate-like members 161 contained in the connector 150. When the front end of the grommet 157 is pressed against the rear ends of the plate-like members 161, it is easy to position the grommet 157 during production of the gas sensor 100. Furthermore, when the front end of the grommet 157 is pressed against the rear ends of the plate-like members 161, it is possible to suppress vibration generated in the sensor element 101 and the like during use of the gas sensor 100.

Meanwhile, the temperature of the sensor element 101 becomes high during use of the gas sensor 100, and thus the temperature of the connector 150 holding the sensor element 101 also becomes high. If heat is likely to be transferred from the connector 150 to the grommet 157, the temperature of the grommet 157 becomes high, and the grommet 157 may rapidly deteriorate.

Figure 7:
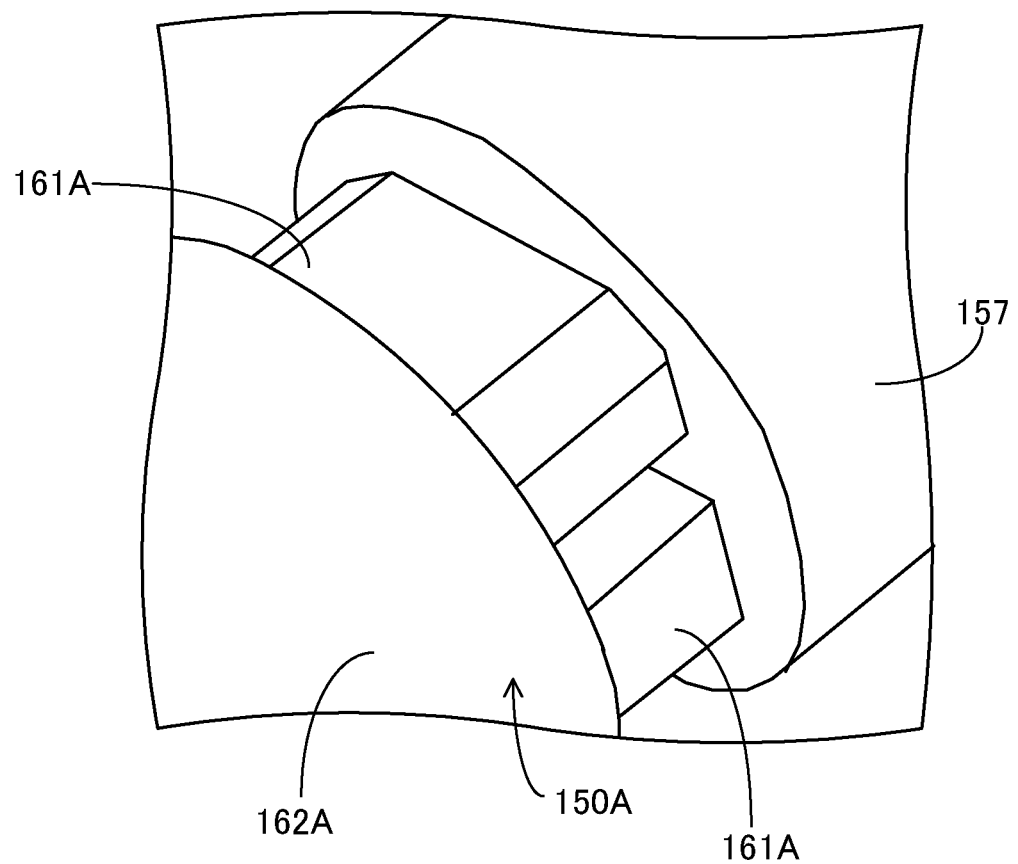
FIG. 7 is a view illustrating a problem that occurs in the case in which a comparative connector is used.

FIG. 7 is a view illustrating a problem that occurs in the case in which a comparative connector 150A is used instead of the connector 150. In FIG. 7, for the sake of facilitating the understanding, the lead wires 155 and the like have been omitted.

As shown in FIG. 7, the connector 150A includes two plate-like members 161A and a fixing member 162A. The plate-like members 161A are not provided with the protruding portions 164, contrary to the plate-like members 161 in this embodiment. Accordingly, in this case, the rear end faces of the plate-like members 161A are entirely in contact with the grommet 157. As a result, heat is likely to be transferred from the connector 150A to the grommet 157, and thus the temperature of the grommet 157 becomes high.

Figure 8:
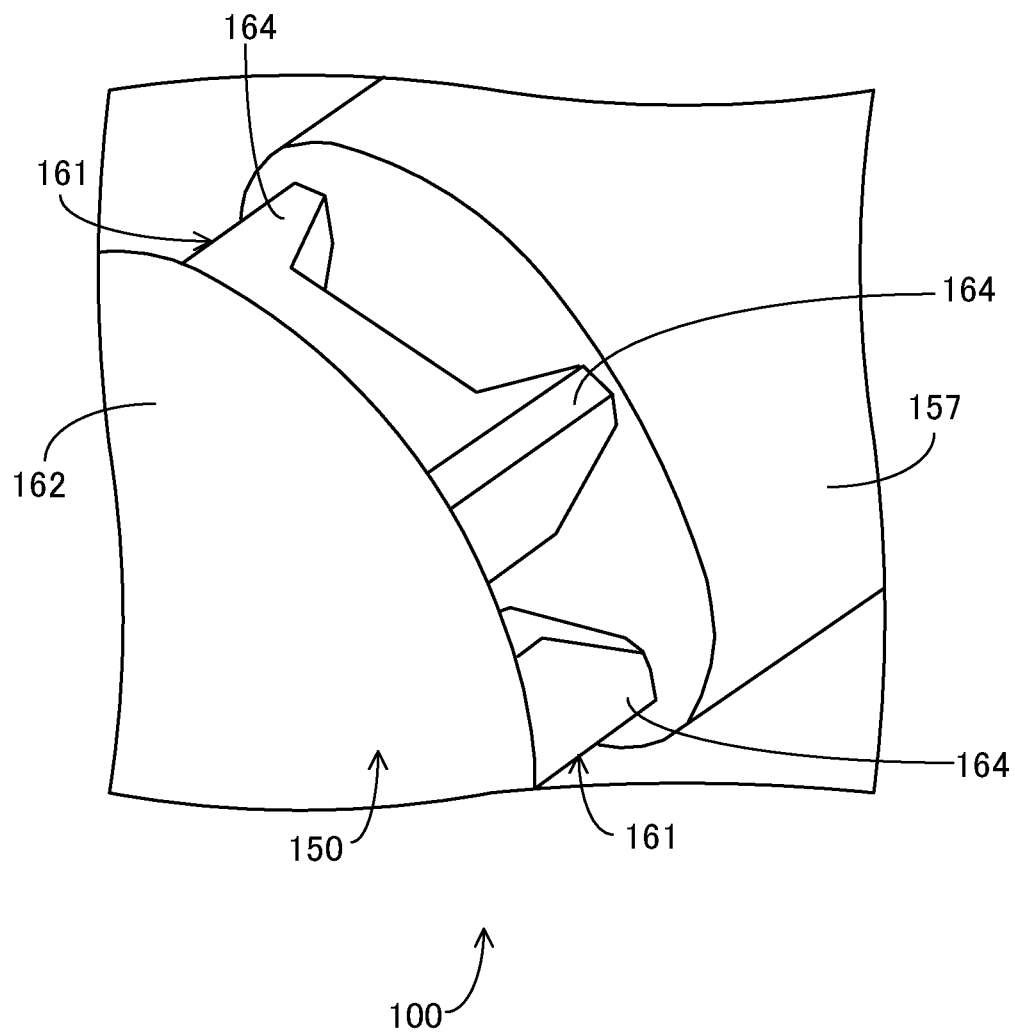
FIG. 8 is a view schematically showing the gas sensor according to an embodiment, at a position thereof corresponding to that in FIG. 7.

FIG. 8 is a view schematically showing the gas sensor 100 according to this embodiment, at a position thereof corresponding to that in FIG. 7. As shown in FIG. 8, in the gas sensor 100, only the protruding portions 164 of the plate-like members 161 are in contact with the grommet 157. More specifically, only the rear end faces of the protruding portions 164 are in contact with the grommet 157. That is to say, in the gas sensor 100, it is not the case that the rear end faces of the plate-like members 161 are entirely in contact with the grommet 157. Thus, according to the gas sensor 100, the contact area between the plate-like members 161 and the grommet 157 is smaller than that in the case in which the rear end faces of the plate-like members 161 are entirely in contact with the grommet 157, and thus it is possible to suppress heat transfer from the plate-like members 161 to the grommet 157. As a result, according to the gas sensor 100, deterioration of the grommet 157 is suppressed, and thus it is possible to prolong the product life of the gas sensor 100.

In particular, in the gas sensor 100, the tip portions (end portions in the vicinity of the rear ends) of the protruding portions 164 are thinner than the base portions of the protruding portions 164, and thus the contact area between the protruding portions 164 and the grommet 157 can be made smaller. Furthermore, according to the gas sensor 100, the base portions of the protruding portions 164 are thicker than the tip portions of the protruding portions 164, and thus the strength of the protruding portions 164 can be ensured to some extent. That is to say, according to the gas sensor 100, it is possible to reduce the contact area between the protruding portions 164 and the grommet 157, and, at the same time, to ensure the strength of the protruding portions 164. For example, the contact area between the protruding portions 164 and the grommet 157 is 5% or less of the area of the front end face of the grommet 157.

Figure 9:
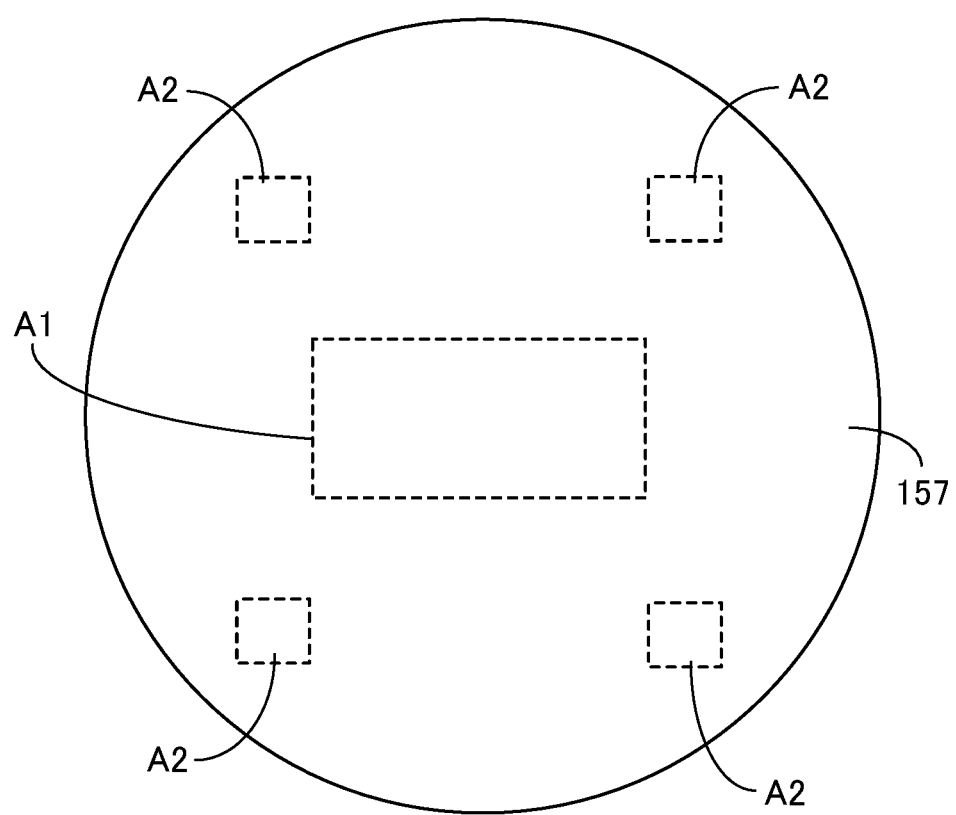
FIG. 9 is a view schematically showing a front end face of the grommet.

FIG. 9 is a view schematically showing the front end face of the grommet 157. Referring to FIG. 9, a region A1 is a region facing the sensor element 101 in a state in which the grommet 157 is pressed against the connector 150. Regions A2 are regions that are brought into contact with the protruding portions 164 of the two plate-like members 161.

In each of the plate-like members 161, the protruding portions 164 are formed at two ends in the longitudinal direction of the rear end face 169, and thus the regions A2 are formed at positions corresponding to four corners of the region A1 in a state in which the sensor element 101 is held between the two plate-like members 161.

The inventor(s) of the present invention found that, in a gas sensor in which a grommet is pressed against a connector, the temperature of the grommet becomes comparatively high at a region thereof facing a sensor element, typically due to the influence of radiant heat from the sensor element.

In the gas sensor 100 according to this embodiment, the protruding portions 164 are in contact with the grommet 157 at positions that are comparatively distant from the region A1 (the region facing the sensor element 101) of the grommet 157. As a result, according to the gas sensor 100, heat is transferred from the plate-like members 161 to the grommet 157 mainly via comparatively low temperature regions (the regions A2) in the grommet 157, and thus it is possible to suppress non-uniformity in the temperature in the grommet 157. As a result, according to the gas sensor 100, deterioration of the grommet 157 is suppressed, and thus it is possible to prolong the product life of the gas sensor 100.

5. CHARACTERISTICS

As described above, in the gas sensor 100 according to this embodiment, the protruding portions 164 formed on the rear end face 169 of the plate-like members 161 (the connector 150) are in contact with the grommet 157, and it is not the case that the rear end faces of the plate-like members 161 are entirely in contact with the grommet 157. Thus, according to the gas sensor 100, the contact area between the plate-like members 161 and the grommet 157 is smaller than that in the case in which the rear end faces of the plate-like members 161 are entirely in contact with the grommet, and thus it is possible to suppress heat transfer from the plate-like members 161 to the grommet 157. As a result, according to the gas sensor 100, deterioration of the grommet 157 is suppressed, and thus it is possible to prolong the product life of the gas sensor 100.

Note that the gas sensor 100 is an example of "gas sensor" of the present invention, and the sensor element 101 is an example of "sensor element" of the present invention. The element sealing member 141 is an example of "element sealing member" of the present invention, and the lead wires 155 are an example of "lead wire" of the present invention. The connector 150 is an example of "connector" of the present invention, and the outer tube 148 is an example of "outer tube" of the present invention. The grommet 157 is an example of "grommet" of the present invention, and the plate-like members 161 are an example of "plate-like member" of the present invention. The protruding portions 164 are an example of "protruding portion" of the present invention, and the protective cover 130 is an example of "protective cover" of the present invention.

6. MODIFIED EXAMPLES

Although an embodiment of the present invention has been described above, the present invention is not limited to the foregoing embodiment, and various modifications can be made within the scope not departing from the gist of the invention. Hereinafter, modified examples will be described.

6-1

In the gas sensor 100 according to the foregoing embodiment, the first internal cavity 20 and the second internal cavity 40 are formed in the sensor element 101. That is to say, the sensor element 101 has a two-cavity structure. However, the sensor element 101 does not absolutely have to have a two-cavity structure. For example, it is also possible that the sensor element 101 has a three-cavity structure.

Figure 10:
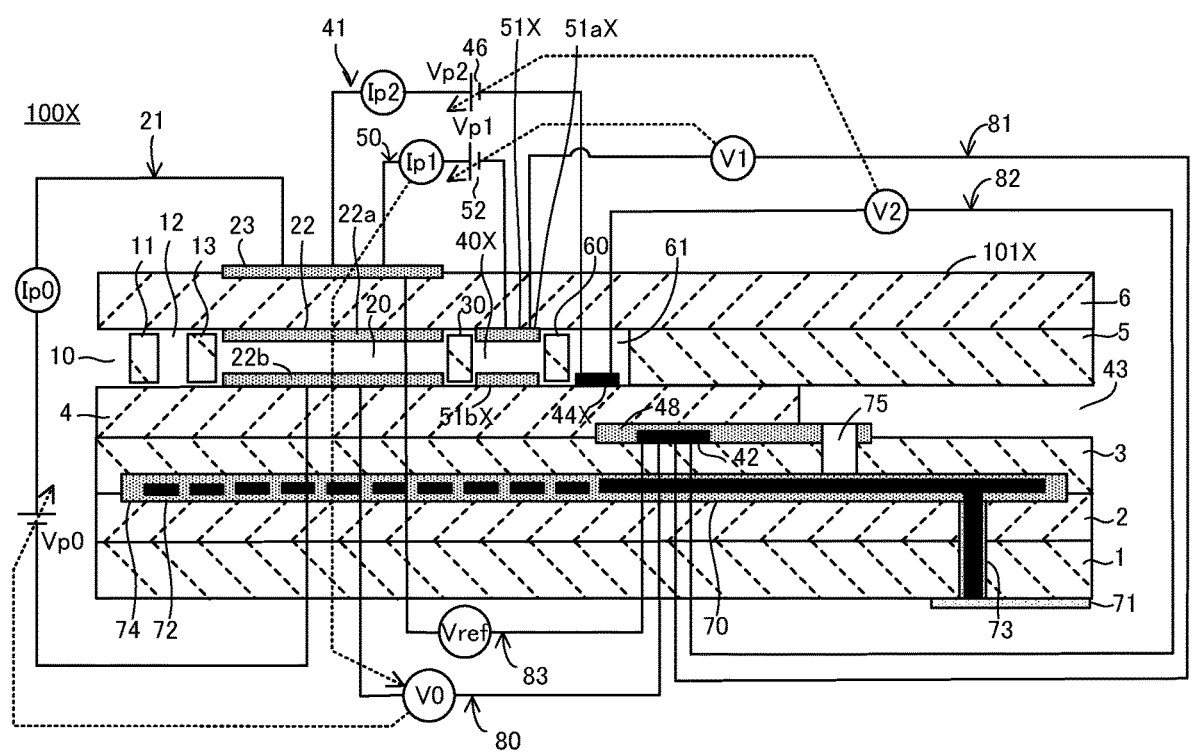
FIG. 10 is a cross-sectional schematic view schematically showing an example of the configuration of a sensor element with a three-cavity structure according to a modified example.

FIG. 10 is a cross-sectional schematic view schematically showing an example of the configuration of a sensor element 101X with a three-cavity structure. It is also possible that, as shown in FIG. 10, the second internal cavity 40 (FIG. 3) is further divided by a fifth diffusion control unit 60 into two cavities consisting of a second internal cavity 40X and a third internal cavity 61. In this case, an auxiliary pump electrode 51X may be arranged in the second internal cavity 40X, and a measurement electrode 44X may be arranged in the third internal cavity 61. In the case of applying a three-cavity structure, the fourth diffusion control unit 45 may be omitted.

6-2

Furthermore, in the gas sensor 100 according to the foregoing embodiment, two protruding portions 164 are formed on each of the plate-like members 161. However, the number of protruding portions 164 formed on each of the plate-like members 161 is not limited to two. For example, it is also possible that one protruding portion 164 or three or more protruding portions 164 are formed on each of the plate-like members 161.

6-3

Furthermore, in the gas sensor 100 according to the foregoing embodiment, the protruding portions 164 are formed at two ends in the longitudinal direction of the rear end face 169 of each of the plate-like members 161. However, the positions at which the protruding portions 164 are formed are not absolutely limited to this. For example, it is also possible that the protruding portions 164 are formed at positions in the vicinity of the center of the rear end face 169 of each of the plate-like members 161.

6-4

Furthermore, in the element sealing member 141 contained in the gas sensor 100 according to the foregoing embodiment, the green compact 145a is held between the ceramic supporters 144a and 144b, and the green compact 145b is held between the ceramic supporters 144b and 144c. However, the number and arrangement of the ceramic supporters and the green compacts are not limited to this. For example, it is also possible that only two ceramic supporters are used, and a green compact is held between the two ceramic supporters.

6-5

Furthermore, in the gas sensor 100 according to the foregoing embodiment, the connector 150 includes the two plate-like members 161. However, the connector 150 does not absolutely have to include the two plate-like members 161. For example, it is also possible that a member obtained by forming the two plate-like members 161 in one piece holds the portion of the sensor element 101 in which the electrode pads 170 are formed, or that a tubular member surrounds the portion of the sensor element 101 in which the electrode pads 170 are formed.

7. EXAMPLES, ETC.

7-1. Examples 1 and 2 and Comparative Example 1

Two gas sensors 100 were produced as Examples 1 and 2, and a gas sensor was produced as Comparative Example 1. Examples 1 and 2 and Comparative Example 1 were different from each other only in terms of the shape of the plate-like members 161. In Examples 1 and 2, the shape of the plate-like members 161 was a shape with the protruding portions 164 as shown in FIG. 8. In Comparative Example 1, the shape of the plate-like members 161 was a shape without the protruding portions 164 as shown in FIG. 7. Note that the area of the front end face of the grommet 157 was 75.8 mm$^2$ in all of Examples 1 and 2 and Comparative Example 1.

In the gas sensor 100 in Example 1, the total area of the rear end faces of the four protruding portions 164 contained in the two plate-like members 161 was 3.4 mm$^2$. That is to say, the contact area between the protruding portions 164 and the grommet 157 was 4.5% of the area of the front end face of the grommet 157.

In the gas sensor 100 in Example 2, the total area of the rear end faces of the four protruding portions 164 contained in the two plate-like members 161 was 2.6 mm$^2$. That is to say, the contact area between the protruding portions 164 and the grommet 157 was 3.4% of the area of the front end face of the grommet 157.

In the gas sensor in Comparative Example 1, the total area of the rear end faces of the two plate-like members 161A was 15.1 mm$^2$. That is to say, the contact area between the plate-like members 161A and the grommet 157 was 19.9% of the area of the front end face of the grommet 157.

7-2. Evaluation Test

Only the protective cover 130 portions of the gas sensors in Examples 1 and 2 and Comparative Example 1 were inserted into a burning furnace. In this state, the gas sensors were operated. Subsequently, the temperature inside the burning furnace was increased.

Figure 11:
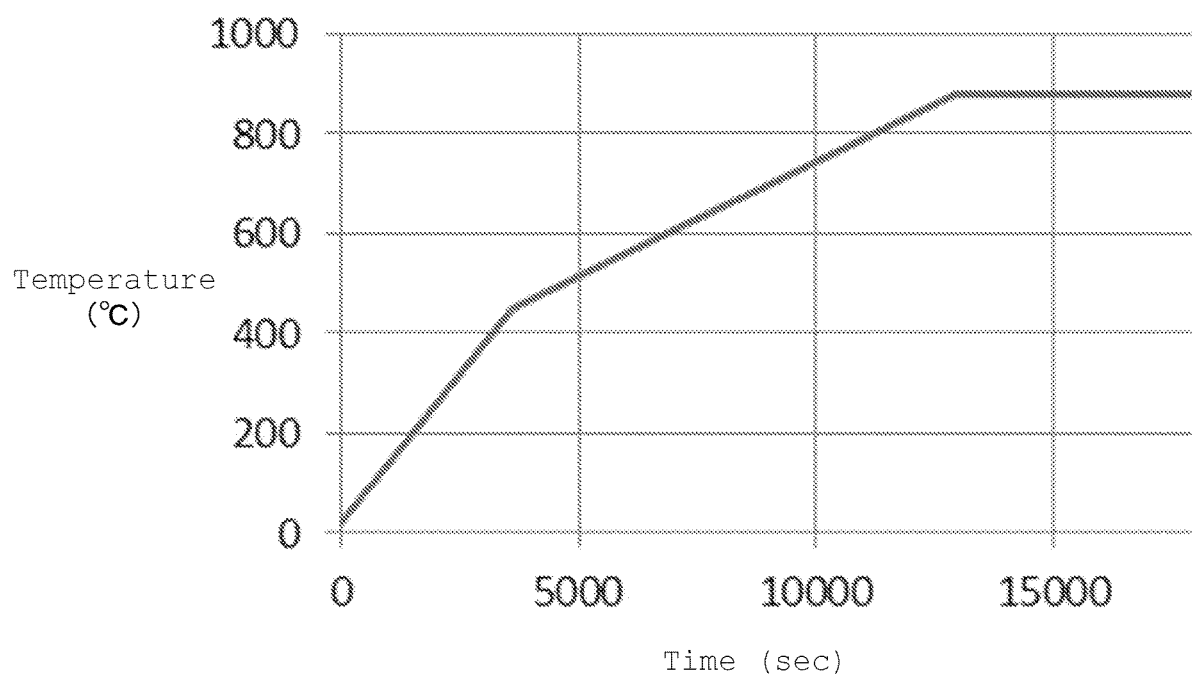
FIG. 11 is a graph showing a heat curve inside a burning furnace.

FIG. 11 is a graph showing a heat curve inside the burning furnace. As shown in FIG. 11, the temperature inside the burning furnace was gradually increased to 800° C. or more.

In this evaluation test, the temperatures of the grommets 157 and the temperatures of the nuts 147 were measured. The temperatures of the grommets 157 were measured by sticking a thermocouple into the grommets at a position away, rearward by about 1 mm, from the contact position with the protruding portions 164. The temperatures of the nuts 147 were measured by arranging a thermocouple on the surfaces of the nuts 147. In this evaluation test, evaluation was performed by comparing the temperatures of the grommets 157 when the temperatures of the nuts 147 reached 650° C.

FIG. 12 is a table showing the result of the evaluation test. As shown in FIG. 12, the temperature of the grommet 157 was 268° C. in Comparative Example 1. On the other hand, the temperature of the grommet 157 was 258° C. in Example 1, and the temperature of the grommet 157 was 253° C. in Example 2. That is to say, the temperature of the grommet 157 was reduced by 10° C. in Example 1, and the temperature of the grommet 157 was reduced by 15° C. in Example 2.

For example, when the gas sensor 100 is used in a state of being attached to the pipe 190 (FIG. 1) such as an exhaust gas pipe of a vehicle, the temperature inside the pipe 190 is not always high. That is to say, in an ordinary use environment, the temperature of the gas sensor 100 repeatedly increases and decreases. Accordingly, if the temperature increase speed of the grommet 157 is slow, it is possible to reduce the possibility that the temperature of the grommet 157 increases to a degree that the grommet 157 rapidly deteriorates. In Examples 1 and 2 above, the temperature increase speeds of the grommets 157 were slower than that of Comparative Example 1. That is to say, according to the gas sensors 100 in Examples 1 and 2, it is possible to suppress deterioration of the grommets 157 compared with the gas sensor in Comparative Example 1.

LIST OF REFERENCE NUMERALS

1 First substrate layer
2 Second substrate layer
3 Third substrate layer
4 First solid electrolyte layer
5 Spacer layer
6 Second solid electrolyte layer
10 Gas introduction opening
11 First diffusion control unit
12 Buffer space
13 Second diffusion control unit
20 First internal cavity
21 Main pump cell
22 Internal pump electrode
22a, 51a, 51aX Ceiling electrode portion
22b, 51b, 51bX Bottom electrode portion
23 External pump electrode
30 Third diffusion control unit
40, 40X Second internal cavity
41 Measurement pump cell
42 Reference electrode
43 Reference gas introduction space
44, 44X Measurement electrode
45 Fourth diffusion control unit
46, 52 Variable power source
48 Air introduction layer
50 Auxiliary pump cell
51, 51X Auxiliary pump electrode
60 Fifth diffusion control unit
61 Third internal cavity 70 Heater unit
72 Heater electrode
72 Heater
73 Through-hole
74 Heater insulating layer
75 Pressure dispersing hole
80 Main pump-controlling oxygen partial pressure detection sensor cell
81 Auxiliary pump-controlling oxygen partial pressure detection sensor cell
82 Measurement pump-controlling oxygen partial pressure detection sensor cell
83 Sensor cell
100 Gas sensor
101 Sensor element
130 Protective cover
131 Inner protective cover
132 Outer protective cover
133 Sensor element chamber
140 Sensor assembly
141 Element sealing member
142 Main fitting
143 Inner tube
143a, 143b Reduced diameter portion
144a-144c Ceramic supporter
145a, 145b Green compact
146 Metal ring
147 Nut
148 Outer tube
149 Space
150, 150A Connector
155 Lead wire
157 Grommet
161, 161A Plate-like member
162, 162A Fixing member
163 Plate-like member body portion
164 Protruding portion
165, 166 Partitioning wall portion
167, 168 Abutting portion
169 Face
170 Electrode pad
190 Pipe
191 Fixing member
A1, A2 Region
T1, T2 Taper

What is claimed is:

1. A gas sensor configured to measure a concentration of a predetermined gas component in a measurement target gas, comprising:
    a sensor element having, in the vicinity of a rear end thereof, a surface on which an electrode pad is formed;
    an element sealing member configured to hold part of the sensor element;
    a lead wire;
    a connector configured to hold the portion of the sensor element in which the electrode pad is formed, and to electrically connect the electrode pad and the lead wire;
    an outer tube configured to be fixed to the element sealing member, and to surround the connector; and
    a grommet configured to be attached to a rear end of the outer tube, and to allow the lead wire to extend therethrough,
    wherein a protruding portion is formed on a rear end face of the connector,
    wherein the protruding portion and the grommet are in contact with each other,
    wherein only a rear end face of the protruding portion is in contact with the grommet, and
    wherein the rear end face of the protruding portion and a front end face of the grommet are in contact with each other at a position not facing the sensor element on the front end face of the grommet.

2. The gas sensor according to claim 1, further comprising:
    a protective cover configured to be fixed to the element sealing member, and to cover a front end of the sensor element, wherein the element sealing member provides sealing between spaces, the spaces being a space formed between the element sealing member and the protective cover, and a space formed between the element sealing member and the outer tube.

3. The gas sensor according to claim 1, wherein a contact area between the protruding portion and the grommet is greater than 0% and less than or equal to 5% of an area of the front end face of the grommet.

4. The gas sensor according to claim 1,
    wherein the connector includes a plurality of plate-like members,
    the portion of the sensor element in which the electrode pad is formed is held between the plurality of plate-like members, and
    the protruding portion is formed on a rear end face of each of the plurality of plate-like members.

5. The gas sensor according to claim 4,
    wherein two protruding portions are formed on the rear end face of each of the plurality of plate-like members,
    one of the two protruding portions is formed at one end in a longitudinal direction of the rear end face, and
    another of the two protruding portions is formed at another end in the longitudinal direction of the rear end face.

6. The gas sensor according to claim 4, wherein, in both of a plan view of the plate-like members and a side view of the plate-like members, the protruding portions are respectively provided with tapers in which the protruding portions are thinner toward the rear end faces.

* * * * *